United States Patent [19]

Jameson et al.

[11] Patent Number: 5,356,639
[45] Date of Patent: Oct. 18, 1994

[54] PROCESS FOR PRODUCING CHEESE CONTAINING SUBSTANTIALLY ALL THE CASEIN AND WHEY PROTEINS IN MILK

[75] Inventors: Graeme W. Jameson, Kew; Brian J. Sutherland, Springvale South, both of Australia

[73] Assignee: Commonwealth Scientific and Industrial Research Organization/Australian Dairy Corporation, Campbell, Australia

[21] Appl. No.: 49,638

[22] Filed: Apr. 16, 1993

Related U.S. Application Data

[63] Continuation of Ser. No. 68,360, Jun. 29, 1987, abandoned, which is a continuation of Ser. No. 370,136, Apr. 20, 1982, abandoned, which is a continuation-in-part of Ser. No. 288,885, Jul. 31, 1981, abandoned.

[51] Int. Cl.$^5$ .................... A23C 9/142; A23C 19/024; A23C 19/028; A23C 19/08
[52] U.S. Cl. ........................................ 426/40; 426/36; 426/582; 426/491
[58] Field of Search ....................... 426/34, 36, 40, 42, 426/43, 491, 582

[56] References Cited

U.S. PATENT DOCUMENTS

| | | | |
|---|---|---|---|
| 3,105,764 | 10/1963 | Wagner | 426/36 |
| 3,120,443 | 2/1964 | Berridge | 426/40 |
| 3,297,451 | 1/1967 | Eggen et al. | 426/36 |
| 3,316,098 | 4/1967 | Noznick et al. | 426/40 |
| 3,492,725 | 2/1970 | Staal | 51/48 |
| 3,882,250 | 5/1975 | Loter et al. | 426/36 |
| 3,899,596 | 8/1975 | Stenne | 426/40 |
| 3,914,435 | 10/1975 | Maubois et al. | 426/40 |
| 3,963,837 | 6/1976 | Maubois et al. | 426/40 |
| 3,988,481 | 10/1976 | Coulter et al. | 426/40 |
| 4,194,011 | 3/1980 | Invemizzi et al. | 426/8 |
| 4,205,090 | 5/1980 | Maubois et al. | 426/40 |
| 4,224,865 | 9/1980 | Grosclaude et al. | 453/99 |
| 4,244,971 | 1/1981 | Wargel et al. | 426/35 |
| 4,401,679 | 8/1983 | Rubin et al. | 426/36 |

FOREIGN PATENT DOCUMENTS

| | | |
|---|---|---|
| 1776070 | 7/1970 | Australia . |
| 4166778 | 11/1978 | Australia . |
| 5170479 | 10/1979 | Australia . |
| 7513552 | 11/1975 | Netherlands . |
| 1410551 | 1/1973 | United Kingdom . |
| 1526935 | 11/1974 | United Kingdom . |
| 1410289 | 10/1975 | United Kingdom . |
| 1540208 | 2/1979 | United Kingdom . |
| 2050797 | 6/1979 | United Kingdom . |

OTHER PUBLICATIONS

Emstrom, et al., J. Da. Sci., vol. 63, 1980, pp. 228–234.
Jenneas, et al. Principles of Dairy Chemistry, John Wiley & Sons, Inc., N.Y., 1959, pp. 325–326.

(List continued on next page.)

*Primary Examiner*—David M. Naff
*Attorney, Agent, or Firm*—Willian Brinks Hofer Gilson & Lione

[57] ABSTRACT

A process and apparatus are provided for producing cheese containing substantially all of the casein and whey proteins in milk. The cheese is produced by ultrafiltering and diafiltering milk to obtain a concentrate having a solids content desired in the cheese, increasing the ionic strength of the concentrate by adding a salt to prevent coagulation during fermenting, fermenting the concentrate without producing a coagulum, preheating the fermented concentrate and evaporating water from the concentrate to obtain cheese having substantially all the casein and whey proteins in milk. Preferably, ultrafiltering and diafiltering produce a concentrate having a concentration ratio of about 3:1 to 6:1, the salt is sodium chloride added in an amount of about 0.5 to 1.5 percent by weight, fermenting is to a pH of about 4.9 to 5.5, preheating is to a temperature of about 60°–100° C., evaporating is continuous at below pressure and the cheese has a solids content of about 58–71 percent. The cheese produced may be converted to cheese. Preventing coagulation during fermenting facilitates evaporation of water after fermenting. Preheating prevents fat separation during evaporation, reduces burn-on of concentrate on evaporator walls and reduces viscosity of the cheeses.

27 Claims, 2 Drawing Sheets

OTHER PUBLICATIONS

Webb, et al. By Products From Milk, 2nd ed. The Ari Publ. Co., Inc. 1970 (pp. 84, 85, 90-101 & 127-128).

Goudedranche et al., Utilization of The New Mineral UF Membranes For Making Semi-Hard Cheeses, Symposium, Lund Institute of Technology, Ystad, Sweden, Sep. 30, 1980.

*Report of Research for 1979-1980* (Sydney, Australia: prepared by the Australian Commonwealth Scientific and Industrial Research Organization, a division of Food Research, a division of the Institute of Animal and Food Sciences, pp. 84-86 and 97-99.

*Report of Research for 1978-1979*(Sydney, Australia: prepared by the Australian Commonwealth Scientific and Industrial Research Organization, a division of Food Research, a division of the Institute of Animal and Food Sciences), pp. 86 and 97-99.

V. K. Sood and F. V. Kosikowski, "Process Cheddar Cheese from Plain and Enzyme Treated Retentates," *J. Dairy Science*, vol. 62, No. 11, (1979) pp. 1713-1718.

Frank V. Kosikowski, "Cheesemaking by Ultrafiltration," *J. Dairy Science*, vol. 57, No. 4, (1973) pp. 488-490.

J. L. Maubis and G. Moequot, "Application of Membrane Ultrafiltration to Preparation of Various Types of Cheese," *J. of Diary Science*, vol. 58, No. 7, pp. 1001-1007.

Frank A. Glover, Paul J. Skudder, Philip H. Stothart, & Evan W. Evans, "Reviews of the Progress of Dairy Science: reverse osmosis and ultrafiltration in dairying," *J. of Dairy Research*, vol. 45, (1978), pp. 291-318.

Rudi Domros, "Automation in the Diary," *Deutsche Molkerei-Zeitung*, 93, (Aug. 31, 1972) pp. 1396-1404.

Vaclav Knez, B. S., "The Future of Diary Technology," *Mlekarske Listy (Dairy Gazette)*, vol. 4, No. 5, (1978).

J. L. Maubois, "Ultrafiltration of Whey," *J. of the Society of Dairy Technology* vol. 33, No. 2, (Apr., 1980), pp. 55-58.

Frank V. Kosikowski, "Cheddar Cheese from Water Reconstituted Retentates," *J. of Dairy Science*, vol. 63, No. 12, (1980) pp. 1975-1980.

B. J. Sutherland, "Progress towards Commercialization of Cheese Curd from Ultrafiltrated Wholemilk" (Address for presentation at the 4th Biennial Cheese Industry Conference, Utah State University, U.S.A., Aug. 1980).

American Dairy Science Association 73rd Annual Meeting Jul. 9-13, ASDA Annual Meeting And Divisional Abstracts, Supplement 1, 1978, JDS-vol. 61, p. 103.

R. DeBoer and J. Hiddink, "Membrane Processes in the Diary Industry," *Desalination*, 35 (1980) pp. 169-192.

K. W. Turner and T. D. Thomas, "Uncoupling of Growth and Acid Production in Lactic Streptococci" New Zealand Journal of Science and Technology, vol. 10, pp. 162-167 (1975).

Hansen, R., "UF-Camembert Manufactured on the New CAMATIC," North European Dairy J. Sep. 1981, pp. 147-152.

Paper entitled, "Production of Cheese-Base Based on Ultrafiltration" by Poul Bjerre, M.Sc. and Rud F. Madsen, Dr. tech., Sep. 15-18, 1981.

A. W. Maurice Sweetsur and D. Donald Muir, "Effect of concentration by Ultrafiltration on the Heat Stability of Skim-milk" the Journel of Diary Research, vol. 47, pp. 327-335 (1980).

B. J. Sutherland and G. W. Jameson, "Composition of Hard Cheese Manufactured by Ultrafiltration" Australian Journal of Diary Technology, Dec. 1981, pp. 136-143.

Dairy Handbook published by Alfa-Laval AB of Sweden, pp. 209-214, undated.

Veda A. Vyskum V Potravinarskom Priemysle, vol. 27, Issued 1975, Herian et al., More Efficient Cheese Production by Controlling the Content of Calcium Salts, pp. 61-72.

Nauchni Trudove, Vissh. Inst. Po Khranitelna I Vkusova Prom. vol. 17, No. 1, Issued 1970, Prodanski, P., Effect of Certain Salts on the Stabilization (Anticoagulation) of Heat-Treated Fresh Milk, pp. 37-42.

Article from the Journal of Dairy Science entitled, "Mozzarella and Cheddar Cheese Manufacture by ultrafiltration Principles" by H. R. Covacevich and F. V. Kosikowski, vol. 61, No. 6, pp. 407-709 (Jun. 1978).

PROCESS FOR PRODUCING CHEESE CONTAINING SUBSTANTIALLY ALL THE CASEIN AND WHEY PROTEINS IN MILK

This application is a continuation of application Ser. No. 07/068,360, filed Jun. 29, 1987, which is a continuation of application Ser. No. 06/370,136, filed on Apr. 20, 1982, which was a continuation-in-part of application Ser. No. 06/288,885, filed Jul. 31, 1981, all now abandoned.

FIELD OF THE INVENTION

This invention relates to processes for making products by selective concentration of milk, food products obtained by such processes, and foods made from such food products.

BACKGROUND OF THE INVENTION

A. Definitions of Terms

"Milk" means the lacteal secretion obtained by the milking of one or more females of a mammalian species, such as cow, sheep, goat, water buffalo, or camel. Broadly speaking, such milk is comprised of casein (a phospho-protein) and soluble proteins, lactose, minerals, butterfat (milkfat), and water. The amount of these constituents in the milk may be adjusted by the addition of, or the removal of all or a portion of, any of these constituents. The term "milk" includes lacteal secretion whose content has been adjusted.

Milk obtained by milking one or more cows is referred to as "cows milk". Cows milk, whose composition has not been adjusted is referred to herein as "whole milk". It is comprised of casein, whey proteins, lactose, minerals, butterfat (milkfat), and water.

The composition of "cows milk" can be adjusted by the removal of a portion of or all of any of the constituents of whole milk, or by adding thereto additional amounts of such constituents. The term "skim milk" is applied to cows milk from which sufficient milkfat has been removed to reduce its milkfat content to less than 0.5 percent by weight. The term "lowfat milk" (or "part-skim milk") is applied to cows milk from which sufficient milkfat has been removed to reduce its milkfat content to the range from about 0.5 to about 2.0 percent by weight.

The additional constituents are generally added to cows milk in the form of cream, concentrated milk, dry whole milk, skim milk, or nonfat dry milk. "Cream" means the liquid, separated from cows milk, having a high butterfat content, generally from about 18 to 36 percent by weight. "Concentrated milk" is the liquid obtained by partial removal of water from whole milk. Generally, the milkfat (butterfat) content of concentrated milk is not less than 7.5 weight percent and the milk solids content is not less than 25.5 weight percent. "Dry whole milk" is whole milk having a reduced amount of water. It generally contains not more than five percent by weight of moisture on a milk solids not fat basis. "Nonfat dry milk" is the product obtained by the removal of water only from skim milk. Generally, its water content is not more than five weight percent and its milkfat content is not more than 1.5 weight percent.

Thus, the term "cows milk" includes, among others, whole milk, low fat milk, (part-skim milk), skim milk, reconstituted milk, recombined milk, and whole milk whose content has been adjusted.

The term "whey proteins" means cows milk proteins that do not precipitate in conventional cheese making processes. The primary whey proteins are lactalbumins and lactoglobulins. Other whey proteins that are present in significantly smaller concentrations include euglobulin, pseudoglobulin, and immunoglobulins.

In the conventional manufacture of cheese, milk is processed to form a coagulum, which is further processed to produce a semi-solid mass called "cheese curd" (or "curd") and a liquid (whey). The curd contains casein, a small amount of lactose, most of the butterfat, minerals, end water. The whey contains whey proteins, most of the lactose, some of the butterfat, minerals, and water. The curd may be worked (e.g., stirred) and/or combined with certain flavor and taste producing ingredients, and/or ripened using bacteria to produce different varieties of "natural cheese."

One or more varieties of curd or natural cheese can be comminuted and mixed with an emulsifying agent to form, with the aid of heat, a homogeneous plastic mass called "processed cheese". Examples of processed cheese include: "process cheese", "process cheese food", "process cheese spread", and "process cheese product". The various types of processed cheeses are obtained depending on the processing conditions, the specific varieties of curds or natural cheeses used, and the additional ingredients added during the processing.

"Imitation cheese" is a food made in semblance of any natural cheese variety, processed cheese, or other foods made of natural or processed cheese, in which casein, caseinates, and/or safe and suitable non-milk ingredients, such as vegetable proteins and vegetable oil, replace all or part of the nutritive milk components normally found in the food being simulated.

Herein "buffer capacity" is the resistance of a system to pH change and is expressed in milliequivalents of hydrochloric acid absorbed per 100 grams of sample. Buffer capacity is measured by diluting 2 g of the milk, or the equivalent amounts of process fluid with 100 mL of distilled water and titrating with 0.05N hydrochloric acid to pH 5.1 until that pH remains constant for least twenty seconds. "Lactose" is expressed as grams of anhydrous lactose per 100 grams of sample.

B. The Problem This Invention Addresses

Natural cheese of the types used as bases for making processed cheese products, for example, Cheddar, stirred curd, Colby, Gouda, or Swiss, are made by coagulating milk, ripened with suitable lactic acid producing bacteria to a suitable acidity, with appropriate milk clotting enzymes, cutting the coagulum and cooking the resulting curd in its whey. The whey is drained from the curd, whereupon the curd may be cheddared or stirred while additional acid is produced by fermentation of lactose to lactic acid in the curd. The curd may or may not be washed with water. If cheddared, the curd is milled, whereupon it is salted and pressed into rectangular blocks or packed into barrels for maturing. The addition of lactic acid producing bacteria, ripening of the milk, cutting the curd, cooking the curd, stirring the curd, cheddaring the curd and salting the curd are all controlled to yield a product in which the residual lactose and the unused buffer capacity of the curd are balanced so that complete fermentation of the residual lactose in the curd to lactic acid will result in a cheese with the proper minimum pH for the particular market requirements, usually between 4.9 and 5.5.

The conventional processes for making natural and processed cheeses utilize only casein. Whey proteins remain dissolved in the whey and are discharged as a by-product of the process. The whey proteins comprise about 14 to 24 weight percent of whole or skim milk's proteins and the nutritional value of the whey proteins is at least comparable to the nutritional value of casein. Accordingly, the loss of the whey proteins in the conventional cheese making processes limits the potential yields of such processes. The utilization of even a portion of the whey proteins in the manufacture of natural and processed cheeses is of great commercial importance.

C. Prior Attempt to Recover Whey Proteins

For above-stated reasons, efforts have been made to design a process that would allow full utilization of the whey proteins in cheese making.

One approach is to recover whey proteins from the whey by drying, condensing, ultrafiltration, or reverse osmosis of the whey. The recovered whey proteins are then recombined with the cheese. Such processes are described for example in F. V. Kosikowski, *Cheese and Fermented Foods*, Edwards Brothers, Inc., Ann Arbor, Mich., 2 ed. 1977, pp. 451–458.

A problem with this approach is that some countries have laws which prohibit, for most types of natural cheeses, recombining separately recovered whey proteins with the curd. For example, in the United States whey proteins can be reincorporated into cheese curd only in the making of certain natural cheeses, such as skim milk cheese.

An additional problem associated with this approach is that the recovered whey constituents lack the physical and chemical characteristics required for the making of natural cheese. For example, the dried whey proteins can be sprinkled into the cheese curd. However, only a limited amount of whey proteins can be added to cheese curd in this manner without changing its desired properties. Accordingly, the whey proteins recovered from whey are not used to any significant extent in commercial processes for making natural cheese.

For these same reasons whey proteins recovered in this manner are not used to any significant extent in the commercial manufacture of process cheeses. Moreover, it is commercially feasible to add only limited amounts of such recovered whey proteins to process cheese spreads, process cheese foods, process cheese products, or imitation cheeses.

Another approach for utilization of whey proteins in cheese making is to co-precipitate them with the casein. One process for obtaining co-precipitates of casein and whey proteins from milk is disclosed in U.S. Pat. No. 3,535,304 and in the corresponding Australian Patent No. 403,065 (hereinafter referred to as the Muller patents). The Muller patents specify that the product resulting from this process should find acceptance in some forms of baby food, ice cream, coffee whiteners, small goods, biscuits, bread, breakfast cereals, and canned processed foods. The final product of the Muller process lacks the "functionality" for making processed and imitation cheeses, i.e., it does not have the functional characteristics that are required for making such cheese.

Other known processes for the production of co-precipitates of casein and whey proteins also result in products that, although useful for some applications, cannot be used as starting materials for making cheese.

A further approach for increasing the yields of cheese making processes by utilization of the whey proteins is by ultrafiltration of milk. It has previously been proposed to produce products suitable for conversion into cheese by altering the composition of whole or skim milk utilizing ultrafiltration or reverse osmosis. The milk is contacted with a membrane which permits the passage of water, lactose, and some minerals, but prevents the passage of casein, the whey protein, butterfat, and some minerals. The selective concentration of milk results in the formation of a retentate which contains whey proteins. When the retentate is coagulated by acid or rennet, it forms a curd which contains the whey proteins. If this coagulum is then subject to syneresis some of the whey proteins are lost in the expressed whey. One method for producing cheese by ultrafiltration of milk is disclosed in U.S. Pat. No. 4,205,090 (Maubois et al,) and in Australian Patent Specification No 477,399. According to this method, whole or skim milk is concentrated by ultrafiltration to about one fifth of its volume to give a product, sometimes called a "liquid pre-cheese", which is then manufactured by conventional means to give cheese. This method, however, is only suitable for making soft cheeses of the Camembert or Reblochon type and possibly some semi-hard cheeses. It cannot be used to produce harder cheese of the Cheddar, Colby, or stirred-curd type, because the water content of the pre-cheese is too high and the ratio of buffer capacity to lactose will not give the desired final pH in the product.

More recently, C. A. Ernstrom, E. J. Sutherland and G. W. Jameson described in an article entitled "Cheese Base for Processing: A High Yield Product from Whole Milk by Ultrafiltration" and published in *Journal of Dairy Science*, Vol. 63, 228–234, (1980), a process whereby the moisture content and pH of the final product can be controlled to any desired levels. This process provides a product, cheese base, which has a moisture content and pH appropriate for use in place of conventionally made natural cheeses in the production of process cheeses. In the Ernsttom et. al. process, whole milk of normal pH or acidified to pH 5.7 is concentrated by ultrafiltration, to 40% original milk weight and diafiltered at constant volume until a desired ratio of lactose to buffer capacity is established. Then the retentate is further concentrated by ultrafiltration to 20% of the original milk weight. The retentates are then inoculated with cheese starter and incubated to completely ferment the residual lactose. Precise control of final pH is achieved by controlling the level of lactose through diafiltration.

The fermented retentate is converted in a batch manner to cheese base in a swept-surface vacuum pan evaporator. The cheese base can be used to replace the unripened natural cheese component of processed cheese as it has the same pH and gross composition as Cheddar cheese. The use of the batch evaporator is necessitated by the fact that the retentate upon fermentation forms a curd or coagulum. Such a product cannot be readily processed in any continuous flow evaporator. Accordingly, the overall process of Ernstrom et. al. is essentially a batch process.

Thus the prior attempts have been unsuccessful in devising a process for economical utilization of whey proteins in the manufacture of products with a composition of cheese. There is therefore an unsatisfied, long-felt need for a high-yield efficient process for making such products The present invention is concerned with improvements to the Ernstrom et. al. process just described, particularly in relation to the adaptation of the process to commercial use.

SUMMARY OF THE INVENTION

This invention provides a process for an efficient production of cheese or cheese base containing substantially all the casein and whey proteins which were originally present in the milk. The process permits an efficient evaporation of water from the fermented concentrate by maintaining the fermented concentrate in the liquid state prior to the evaporation step. The process avoids the possibility of losing whey proteins by totally eliminating syneresis.

The process of the present invention comprises four phases: (1) selective concentration of milk to form a concentrate; (2) increasing the ionic strength of the concentrate so as to maintain it in the liquid phase during fermenting, (3) fermenting the concentrate; and (4) removing water from the fermented concentrate to produce cheese or cheese base containing substantially all the casein and whey proteins originally present in the milk.

The process of the present invention produces unique intermediate products: a unique concentrate and fermented concentrate which do not coagulate even at low pH values (i.e., 4.9–5.5).

It has been found that preheating the fermented concentrate prior to water removal in phase four provides unexpected results, namely: (1) preventing phase separation (i.e. oiling off) during water removal at high percent solids; (2) reducing burn-on during water removal; and (3) reducing the viscosity of the resultant product.

DETAILED DESCRIPTION OF THE PROCESS

A. General Description of the Process

The process of the present invention permits an efficient production of cheese and cheese base from milk. The efficiency of the process stems from increasing the ionic strength of the concentrate prior to or during fermentation but before the formation of any coagulum. The increase in the ionic strength maintains the concentrate in the liquid state during and after the fermentation. This allows an easy removal of water from the fermented concentrate so that the desired moisture level can be achieved in a commercially feasible manner. The increase of the ionic strength prevents the formation of a coagulum and subsequent syneresis and thereby assures that the whey proteins remain in the concentrate and are included in cheese or cheese base.

The process of the present invention can be subdivided into four phases: (1) selectively concentrating milk to form a concentrate; (2) increasing the ionic strength of the concentrate so as to maintain it in the liquid phase during and after fermentation; (3) fermenting the concentrate; and (4) removing water from the fermented liquid concentrate until a desired moisture level is reached.

B. Raw Materials for the Process

The process of the present invention can be carried out on any milk. The milk used in the process of the present invention may be pasteurized or homogenized before the completion of the selective concentration phase.

During the process of the present invention neither protein nor butterfat is normally removed from the concentrate. Accordingly, if a specific ratio of protein to butterfat is desired in the final product such ratio is preferably established before the concentration phase. For example, a product which will substitute for a natural Cheddar cheese (having 50.5 to 51.5% fat in dry matter) will require a protein/fat ratio of 0.63 to 0.64 when measured as casein/fat ratio by the Walker Casein Test. The adjustment of the protein to fat ratio can be achieved by either adding or removing one of these components.

In situations where it is preferred to ultrafilter skim or part-skim milk, protein to fat ratio of the final product may be adjusted by an appropriate incorporation of milk fat in the form of cream, anhydrous milk fat, or butter, at any stage after ultrafiltration.

C. The Selective Concentration of Milk to Form A Concentrate

The purpose of this phase is to achieve the desired levels of moisture and lactose in the concentrate. The precise moisture level depends on the desired moisture in the final product and the cost of removal of the moisture by ultrafiltration as opposed to evaporation. While the process can be operated in a concentration ratio of from 1:1 to 9:1, a concentration ratio of from 3:1 to 6:1 compared to the original milk is preferred.

The reason for adjusting the level of lactose is that the ratio of buffer capacity to lactose determines the pH of the final product. In other words, the pH desired in the final product can be achieved by controlling the ratio of buffer capacity to lactose concentration during the selective concentration phase.

The ratio of buffer capacity to lactose is, in turn, controlled by the manner of preparation of the process fluid, i.e., in the preferred process by a combination of the extent of diafiltration and the degree of ultrafiltration (concentration) of the retentate following diafiltration.

The desired buffer capacity to lactose ratio can be achieved in any desired manner. It is presently preferred to use for that purpose a combined ultrafiltration and diafiltration treatment. The preferred manner of carrying out this treatment comprises:

(1) concentrating whole milk by ultrafiltration until about 40% to 60% by weight of the milk has been removed as the permeate fraction;

(2) subjecting the retentate friction to diafiltration, preferably continued until The amount of water added is from 15 to 91% of the weight of the original milk; and (3) resuming and continuing ultrafiltration until the retentate fraction amounts to about 20% to 30% of the weight of the original milk.

The extent of diafiltration and ultrafiltration steps are adjusted so as to achieve the desired buffer capacity to lactose ratio. For example, a ratio of buffer capacity to lactose of 5.7 at the end of the diafiltration step and 16.5 at the end of the second ultrafiltration step will yield a final product with pH 5.2.

D. The Increase of the Ionic Strength of the Concentrate

In this phase the ionic strength of the concentrate is adjusted to substantially eliminate formation of an acid coagulum during fermentation. Such adjustment results in a fermented product which is in the liquid state and can be processed by continuous flow evaporators, for example, a swept surface evaporator.

It is convenient to make the necessary adjustment to the ionic strength of the process fluid by the addition of salt, e.g., sodium chloride, and more preferably by the addition of an amount of sodium chloride sufficient to give the required sodium chloride concentration in the final product.

The addition of sodium chloride, however, is not the only way in which the ionic strength of the process fluid can be adjusted and any other suitable technique may be used so long as it achieves the desired object, that is, the avoidance of the formation of an acid coagulum during fermentation. The ionic strength can be adjusted by the addition of any other non-toxic salt that substantially ionizes in water and does not significantly affect the pH of the concentrate. Examples of such salts include potassium chloride, buffered phosphates, citrates, and mixtures of such salts.

The amount of the salt added must be sufficient to prevent coagulation during fermentation but insufficient to either significantly slow down the activity of the cultures or to exceed the level of salt allowed in the final product. The amount of salt added is generally less than about four percent by weight of concentrate. If sodium chloride is the salt, preferably about 0.5 to 4 percent by weight of the concentrate is added. For sodium chloride the most preferred range is from about 0.5 to 1.5 percent by weight of the concentrate.

The increase of the ionic strength of the concentrate must be effected before the formation of any coagulum.

E. The Fermentation of the Concentrate

The concentrate is innoculated with lactic acid producing agents, such as bacteria, and incubated until the lactose content of the process fluid is consumed or until the pH reaches the desired level.

The presently preferred agents are *Streptococcus lactis*, *Streptococcus cremoris*, or a combination of these, but any desired starter cultures can be employed in this phase.

The fermentation is preferably conducted at the optimum incubation temperature for the starter culture used. Generally the optimum incubation temperature is in the range from about 25° to 35° C.

F. The Removal of Moisture

The moisture can be removed from the fermented concentrate in any convenient manner. It is presently preferred to remove the moisture by evaporation until the moisture content of the product reaches the desired level. Especially preferred are continuous swept surface evaporators, such as Models HS 0050, HS 200, and HS 1200, sold by Luwa Corporation, Charlotte, N.C.

The fermented concentrate is preheated to a selected temperature in the range of 40° C. to 100° C. prior to evaporation. The particular preheat temperature selected will depend principally upon the present total solids sought in the resultant product after evaporation. The preheat temperature should be sufficient to enable evaporation to the total percent solids desired without phase separation in the form of the appearance of free fat (oiling off) but insufficient to cause burning, discolorization, or caramelization. The preheat temperature effective for prevention of oiling off will vary with the feed rate of the concentrate and the preheat time duration and may also vary with seasonal characteristics of the milk being processed.

G. The Product of the Process of this Invention

The present invention produces unique intermediate products: a concentrate and a fermentate, having increased ionic strength by virtue of a non-toxic salt that substantially ionizes in water. The amount of such salt the activity of the cultures or to exceed the level of salt allowed in the final product.

The compositions of the intermediate concentrate and fermentate vary depending on the starting materials, the amount of lactose removed and the concentration achieved. The following are the compositions for a retentate, salted retentive and fermentate obtained from whole milk. The retentate was obtained by a five-fold concentration of whole milk by a combination of ultra- and diafiltration.

| Composition By Weight | Retentate | Salted Retentate | Fermented Salted Retentate |
|---|---|---|---|
| Total Solids | 38–43 | 38–44 | 38–44 |
| Fat in Dry Matter | 50–55 | 50–55 | 50–55 |
| Fat | 18–23 | 18–23 | 17–22 |
| Protein | 13–19 | 13–19 | 13–19 |
| Lactose | 1.6–1.8 | 1.6–1.8 | Trace |
| Ash | 1.5–2 | 1.5–2 | 1.5–2 |
| Sodium Chloride | None | .5–4% | .5–4% |
| pH | 6.6–6.8 | 6.6–6.8 | 4.9–5.4 |

The final products made by the process of this invention vary in the solid contents, pH, and butterfat content depending on the starting materials and the processing conditions.

It is important to note, however, that the process of the present invention can be used to make on a commercial scale a final product which (1) includes substantially all of the whey proteins originally present in the milk and (2) has the composition of hard cheese, such as Cheddar type.

In the preferred embodiment of the invention, i.e., when making cheese base with the composition of Cheddar type cheeses, the pH range in the final product is from 4.9 to 5.5 preferably from 5.1 to 5.2, and the moisture content is in the range from about 33 to 46 weight percent, preferably about 36 weight percent.

The conventional Cheddar cheese process results in the recovery of about 93% of the fat, about 95% of the casein and 7% of the whey proteins from milk. The process of the present invention recovers essentially all the fat, all the casein and about 90% of the whey proteins. This results in a yield increase of about 13–18% over the conventional cheese process. The exact percentage increase of yield will depend on the moisture level in the final product and the composition of the original milk.

Embodiments of the invention are illustrated by the following specific examples. The examples refer particularly to production of cheese-like products of the Cheddar, Colby, or stirred-curd type, and the extents and relative amounts of ultrafiltration and diafiltration given are based on the particular equipment used. The use of other kinds of ultrafiltration equipment, the use of different membranes or the requirements for other cheese types, may alter these specifications for achieving the-proper ratio of lactose to buffer capacity.

DETAILED DESCRIPTION OF AN EMBODIMENT OF THE PRESENT INVENTION

The process of the present invention will now be described in connection with a semi-continuous process for making cheese base of the composition of Cheddar cheese, schematically shown in FIG. 1.

A. Standardization and Heating of Milk

Figure 1:
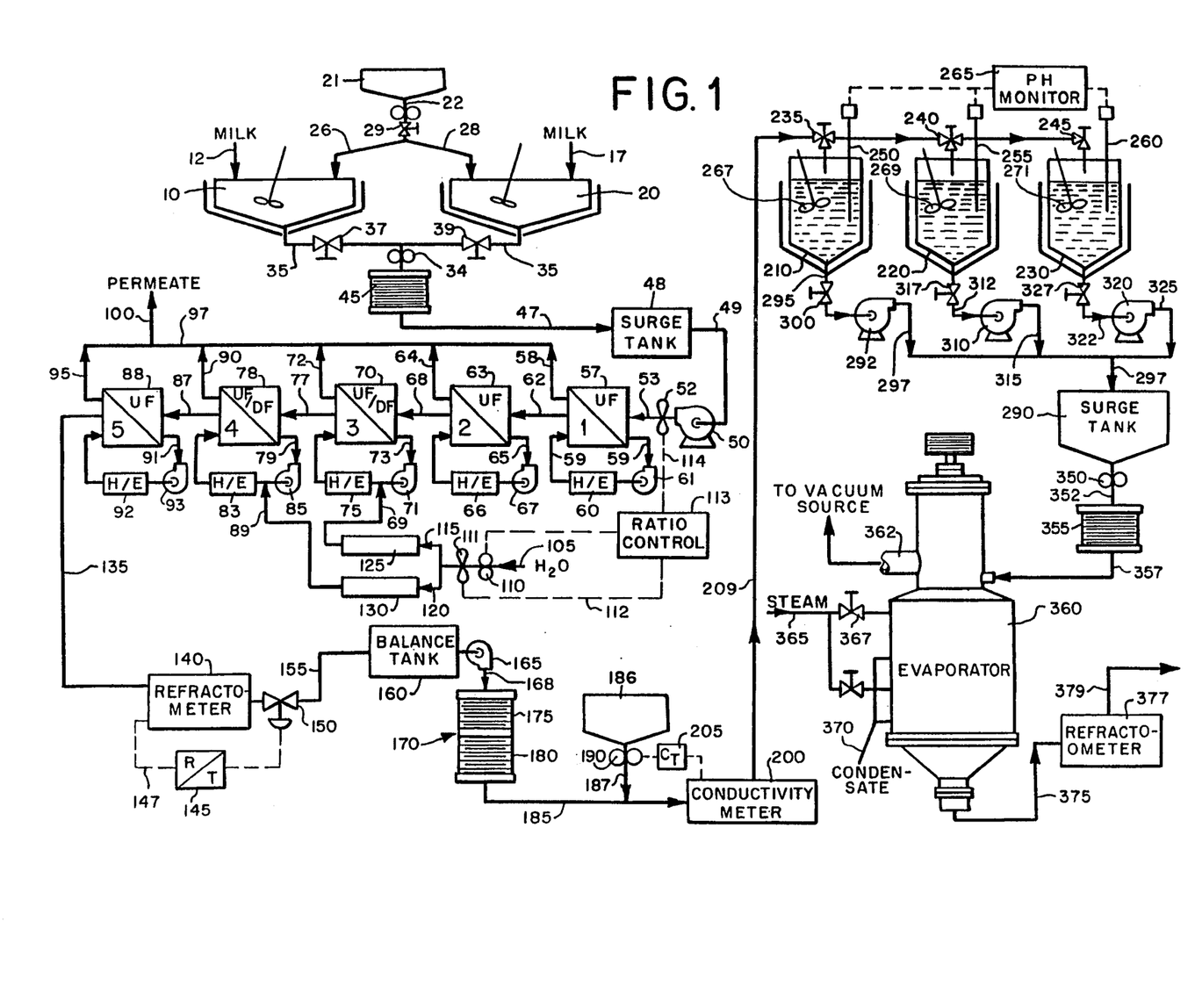
FIG. 1 is a schematic diagram of a semi-continuous process apparatus of this invention.

Referring now to FIG. 1, the whole milk is introduced from storage (not shown) to milk tanks 10 and 20 via lines 12 and 17, respectively. The whole milk in the tanks 10 and 20 is not pasteurized or homogenized. The milk is lightly agitated using stirrers 18 and 19.

Cream from a vessel 21 is added to the milk in the tanks 10 and 20 via lines 22, 26 and 28 to standardize the milk. The amount of cream is manually regulated using a valve 29 to bring the weight ratio of casein to butterfat to about 0.63. The amount of casein is determined by the conventional Walker test described in Jour. Ind. Eng. Chem. Vol. 6, No. 2, 1914 and the article by T. E. Gilmore and W. V. Price published in The Butter, Cheese, and Milk Products Journal Vol. 44, No. 3, 1953. The butterfat is determined by the Babcock method described in Standard Methods for the Examination of Dairy Products (Interdisciplinary Books & Periodicals for the Professional and the Layman, 14th ed. 1978) p. 236–239.

It should be noted that the casein to butterfat ratio changes depending on the desired final product and that instead of adding cream the milk could be standardized by removing some skim milk from the whole milk.

The standardized milk is pumped by a centrifugal pump 34 via a line 35 past either a valve 37 or a valve 39 into a conventional plate heat exchanger 45. The heat exchanger 45 heats the milk to a temperature high enough to obtain efficient performance of the ultrafiltration apparatus but low enough to avoid denaturing the whey proteins. Generally the temperature of milk is in the range from about 40° C. to preferably to 50° C.

B. Ultrafiltration of the Milk

The heated milk is pumped via a line 47 to a surge tank 48. From the surge tank 48, the milk is pumped by a pump 50 via a line 49, a flow meter 52 and a line 53 into a first ultrafiltration module 57. The ultrafiltration module 57 can be of any suitable type. Presently preferred is a two-spiral-membrane module sold by Bell Byant PTY Ltd., of Kensington, Victoria, Australia. This module uses a membrane of ABCOR, Inc., Wilmington, Mass.

In the module 57 the milk is separated into a permeate which leaves the module 57 via a line 58 and a retentate (concentrate). A part of the retentate is recycled via a line 59 and a heat exchanger 60 using a centrifugal pump 61 and a part of the retentate is passed via a line 62 to a second ultrafiltration module 63. The heat exchanger 60 is provided to cool to the preselected ultrafiltration temperature the milk heated as the result of treatment in the ultrafiltration module 57. The ratio of the recycle through line 59 to the through-flow through line 62 varies depending on the operating conditions but is generally in range from about 10:1 to about 20:1.

The retentate entering the module 63 is separated into a second stage permeate and a second stage retentate. The second stage permeate is removed via a line 64. A part of the second stage retentate is recycled via a line 65 and a heat exchanger 66 by a centrifugal pump 67. The heat exchanger 66 cools to the preselected ultrafiltration temperature. The second stage retentate is heated as the result of treatment in the module 63. The recycle to through-flow ratio is in the same range as that of the first stage ultrafiltration.

The second stage retentate is passed via a line 68 to a first diafiltration module 70. The module 70 is substantially identical in construction and operation to the ultrafiltration modules 57 and 63. The only difference is that water is supplied to the module 70 via a line 69 at the same rate as the permeate is removed therefrom via a line 72. The diafiltration results in the removal of additional lactose from the second stage ultrafiltration retentate. The retentate is recycled by a centrifugal pump 71 via a line 73 and a heat exchanger 75 in the same manner as in the ultrafiltration modules.

The retentate is passed from the diafiltration module 70 via a line 77 into a second diafiltration module 78. The retentate of the module 78 is recycled via a line 79, and a heat exchanger 83 by a centrifugal pump 85. Water is added via a line 89 to the retentate at the same rate the permeate is removed from the module 78 via a line 90. The retentate is then passed via a line 87 to a final ultrafiltration module 88.

In the final ultrafiltration module 88, the retentate is recycled via a line 91 and through a heat exchanger 92 by a centrifugal pump 93. The permeate is removed from the module 88 via a line 95. The permeate from modules 57, 63, 70, 78 and 88 are combined in a line 97 and removed from the system via a line 100.

The water introduced into the system via a line 105, is pumped by a pump 110 into lines 115 and 120. A valve 125 controls the flow rate via line 69 and a valve 130 controls the flow rate via line 89. The flow rate of water through line 105 is adjusted by a conventional ratio controller 113 which receives an input from the flow meter 52 via conduit 14 and a flow meter 111 via a conduit 112.

The retentate from the final ultrafiltration module 88 is passed via a line 135 to a conventional refractometer 140. The refractometer 140 determines the level of solids in the retentate. A signal indicative of the level of solids, generated by the refractometer 140 is passed to a conventional controller 145 via a conduit 147. The controller 145 then adjusts control valve 150 which varies the flow rate through a line 135 thereby controlling the residence time and the amount of solid of the retentate. The retentate then flows via a line 155 into a balance tank 160.

C. Pasteurization and Cooling

From the balance tank 160 the retentate is passed by a centrifugal pump 165 via a line 168 through a conventional plate heat exchanger 170 which includes a heating section 175 and a cooling section 180. In the heating section 175 the retentate is pasteurized by being subjected to the temperature of 72° C. for at least fifteen seconds or such other temperatures and times that lead to pasteurization of milk without denaturing the whey proteins. The pasteurization eliminates cultures which could affect the fermentation of the retentate.

The pasteurized retentate is cooled in the cooling section 180 to the optimum incubation temperature which generally about 30° C.

Adjusting of Ionic Strength of the Retentate

From the heat exchanger 170, the retentate is passed into a line 185 and therein mixed with a slurry of sodium chloride in water which is pumped from a tank 186 via a line 187 by a metering pump 190. In the alternative, sodium chloride can be added in crystalline form. The addition of sodium chloride is controlled by monitoring the conductivity of the retentate in a conductivity meter 200. The signal generated by the conductivity meter is fed to a controller 205 which controls the pump 190. The amount of sodium chloride must be sufficient to prevent the coagulation of the retentate during and after fermentation but must be low enough not to significantly retard the fermentation and not to exceed the allowable levels of sodium chloride in the final product. Generally the amount of added sodium chloride is in the range from about 0.5 to 4.2 weight percent of the retentate.

E. Fermentation

The retentate is next passed via a line 209 to one or more jacketed fermentation vessels 210, 220 and 230. The flow into these fermentation vessels is controlled by valves 235, 240 and 245, respectively. The pH in the fermentation vessels 210, 220 and 230 is monitored by probes 250, 255 and 260, respectively, and the pH monitor 265. The content of the vessels 210, 220 and 230 can be stirred by agitators 267, 269 and 271, respectively.

A starter culture such as *Streptococcus cremoris* is manually added to the concentrate in vessels 210, 220 and 230 and the fermentation is allowed to proceed until all lactose is used up or the pH reaches the desired level. The fermented retentate, whose viscosity is about the same as that of heavy cream, is then passed from one or more fermentation tanks 210, 220 or 230 to a surge (balance) tank 290. The fermented retentate from the tank 210 is pumped a pump 290 via lines 295 and 297 by opening a valve 300. The fermented retentate from the tank 220 is pumped by a pump via lines 312, 315 and 297 by opening a valve 317. The fermented retentate from the tank 230 is pumped by a pump 320 via lines 322, 325 and 297 by opening a valve 327.

F. Evaporation

A positive displacement metering pump 350 pumps the fermented retentate from the surge tank 290 via a line 352 to a conventional plate heat exchanger 355.

The fermented retentate is preheated by the heat exchanger 355 for a time period which is dependent upon feed rate. The preheat temperature is set to a level sufficient to prevent phase separation in the form of free fat (oiling off) during evaporation. The specific preheat temperature level selected will depend upon the percent total solids sought in the final product obtained from the evaporator. The preheat temperature level required increases with increase in the percent total solids in the final product and with increase in the retentate feed rate through the heat exchanger 355. For extended runs on a commercial basis, a swept or scraped surface type heat exchanger is preferred.

In addition to preventing oiling off during evaporation, the preheating step prior to evaporation has been found to reduce burn-on on the interior evaporator wall surfaces and to reduce the critically of the evaporator rotor design because of a lower increase in viscosity during evaporation relative to the viscosity increase observed when preheating is either absent or not optimal. Lower viscosity of the final cheese base has a further beneficial effect in that it lessens the load on the discharge system.

The heated fermented retentate is then fed via a line 357 into the evaporator 360 where it is subjected to a vacuum and heat in order to evaporate water. The vacuum is provided via line 362 attached to a vacuum source (not shown). The heating is accomplished by steam passing via a line 365 and valve 367 into a jacket of the evaporator 360. The condensed water is removed from the jacket of the evaporator 360 via a line 370. The heat and vacuum effect the evaporation of water which rapidly increases the viscosity of the fermented retentate. The evaporated fermented retentate is forced to discharge via a line 375 and it is passed through a refractometer 377 to determine the solids level. From the refractometer the final product is discharged via a line 379. Generally the desired solids level is about 65 weight percent. The presently preferred evaporators are series HS evaporators sold by Luwa Corporation, Charlotte, N.C., modified by enlarging the discharge section of the evaporator to permit easier flow of the dewatered, high viscosity final product.

The properties of the final product are such that it can be used for making processed cheeses in place of conventional cheddar cheese.

DESCRIPTION OF ANOTHER EMBODIMENT OF THE PRESENT INVENTION

The process of the present invention can also be carried out in a batch system. The process steps are performed in a manner described in connection with the semi-continuous system except that an ultrafiltration plant and a batch evaporator are used. The equipment for the batch process of the present invention is schematically depicted in FIG. 2.

Figure 2:
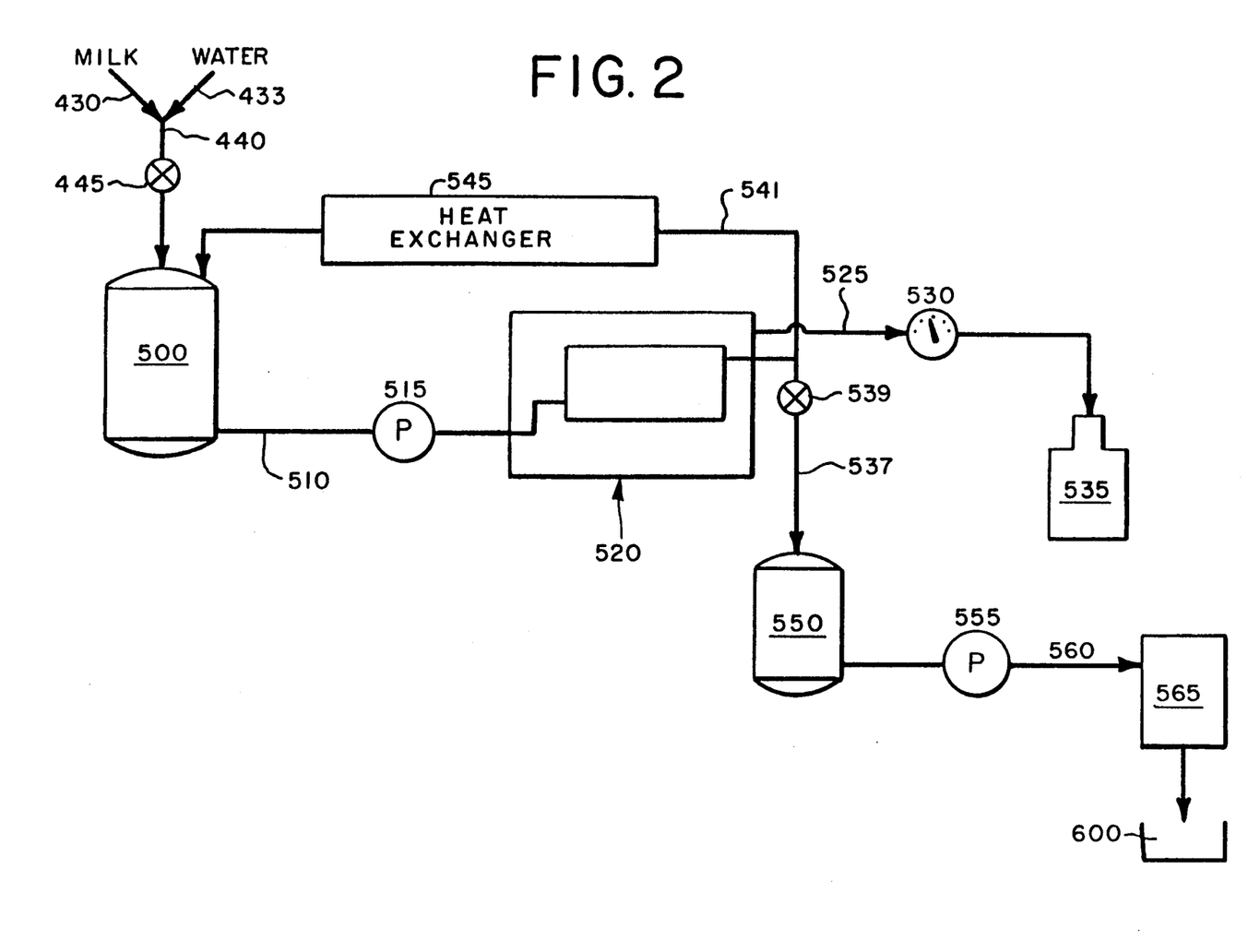
FIG. 2 is a schematic diagram of a batch process apparatus of this invention.

Referring now to FIG. 2, whole milk is fed via lines 430 and 440 past a valve 445 into a jacketed tank 500 where it is standardized and heated to about 50° C. Then the milk is pumped via a line 510 by a pump 515 to an ultra/diafiltration module 520. The permeate from the module 520 is discharged via line 525 and a flow indicator 530 into a measuring container 535.

The retentate is recycled via line 541 through a heat exchanger 545 back into the tank 500. The heat exchanger 545 cools the retentate to the preselected ultrafiltration or diafiltration temperature which is generally about 50° C.

The amount of permeate collected in the container 535 is monitored. When the amount of permeate reaches a predetermined level such as sixty percent of the volume, cold water is fed via lines 433 and 440 and past the valve 445 into the tank 500 at the same rate as the permeate is discharged from the module 520 via the line 525. The diafiltration continues until a predetermined ratio of lactose to buffer capacity (5.7) is achieved. Then the valve 445 is closed and the ultrafiltration is resumed and continued until the amount of permeate reaches a predetermined volume. For the cheese base of the composition of cheddar cheese, such volume is about 4/5 of the initial volume plus the amount of water added for diafiltration.

The retentate is then discharged via a line 537 past a valve 539 into a vessel 550 where 1% of sodium chloride by the weight of the retentate is introduced.

A starter culture (*Streptococcus cremoris* type E8) is then manually added to the retentate in the vessel 550 and the content of the vessel 550 allowed to ferment until the pH is lowered to a predetermined level.

The fermented retentate is pumped by a pump 555 via a line 560 into a swept surface type of evaporator 565 where sufficient amount of moisture is removed from the fermented retentate to achieve the desired solids level in the final product. For a cheese base having a composition of cheddar cheese the desired solids level is about 65 weight percent. The final product is collected in a container 600.

The line 560 preferably includes a flow through heat exchanger (not shown) like heat exchanger 355 in FIG. 1 for preheating the fermented retentate prior to evaporation in the manner previously described. Alternatively, the fermented retentate may be preheated in a batch manner.

In accordance with another aspect of the invention, there is provided a process for production of cheese or cheese base from milk comprising:
(a) ultrafiltering the milk;
(b) diafiltering the milk, said ultrafiltering and diafiltering being carried out so as to produce a retentate having a solids composition desired in said cheese base;
(c) fermenting said retentate without the formation of coagulum; and
(d) preheating said fermented retentate to a temperature and for a time sufficient to prevent phase separation during evaporation to a desired level of percent total solids and then evaporating water from said fermented concentrate to produce said cheese base comprising substantially all of the casein and whey proteins originally present in said milk.

The preheating temperature is generally within the range of about 40° C. to about 100° C. and preferably within the range of about 60° C. to about 75° C. with percent total solids composition in said cheese base in the range of about 58 percent to about 71 percent. The preheating is effective to reduce burn-on of concentrate on the walls of the evaporator and also is effective to reduce the viscosity of said cheese base.

The apparatus for production of cheese base from milk comprises:
means for concentrating said milk to form a concentrate;
means for effecting fermentation of said concentrate without the formation of coagulum;
means for preheating said fermented concentrate for a time and to a temperature sufficient to prevent phase separation in said fermented concentrate during evaporation to a desired level of percent solids; and
means for continuously evaporating water from said concentrate to produce said cheese base. Generally, means for concentrating comprises ultrafiltration and diafiltration modules and means for evaporating water comprises a continuous evaporator. The preheating of said concentrate is effective to reduce burn-on of concentrate on the walls of said evaporator.

Example 1

100 kilograms of pasteurized whole milk was heated to 50° C. and subjected to membrane ultrafiltration in a Paterson-Candy International (PCI) 8 foot, series flow, ultrafiltration module, with T6B membranes. The pressure at the inlet of the module was 90 psi and the pressure at the outlet of the module was 20 psi. The milk was thus separated into a retentate fraction which contains essentially all of the fat together with over 96% of the protein and insoluble salts, and a permeate fraction which contains mostly water, lactose, and soluble salts. Ultrafiltration was continued until approximately 60 kg of permeate had been removed.

At that point a stream of water at 50° C. was introduced into the feed tank at the same rate permeate was expelled from the ultrafiltration membrane. This process is known as diafiltration at constant volume since the "volume of retentate is kept constant by controlling the input of diafiltration water. When approximately 35 kg of diafiltration water had been added, the water was turned off.

The ultrafiltration was then resumed until the amount of retentate remaining was approximately 20% of the weight of the original milk. The retentate at this point contained an appropriate ratio of buffer capacity to lactose so that when the lactose was fermented to lactic acid, the pH of the product was between 5.1 and 5.2. The appropriate ratio was achieved by means of diafiltration and final ultrafiltration.

The retentate was removed from the ultrafiltration equipment and salt was added in an amount such that when the final moisture content of the product was 36% the salt in the water phase equaled 4.5%. The retentate was then cooled to 25° C. and inoculated with a culture of Streptococcus lactis C6 and incubated at 25° C. until the desired pH of 5.2 was achieved.

The fermented retentate was then introduced into a swept surface vacuum evaporator. The operating conditions of the vacuum evaporator were selected so that the vapor temperature in the evaporator was in the range 45° to 55° C. The moisture was removed therein by evaporation until the final product containing about 36% moisture was achieved.

The composition of the retentate after the second ultrafiltration step but before fermentation and that of the final product were as follows:

|  | Retentate before fermentation (weight percent) | Retentate after evaporation (weight percent) |
|---|---|---|
| Total solids | 40.65 | 64.0 |
| Fat | 21.36 | 33.6 |
| Protein | 15.9 | 25.0 |
| Lactose | 1.0 |  |
| Calcium | 0.48 | 0.76 |
| Orthophosphate | 0.77 | 1.22 |
| Sodium chloride |  | 1.6 |
| Lactic acid |  | 1.6 |

The pH, buffer capacities, and buffer capacity/lactose ratio, were as follows:

|  | Retentate before fermentation (weight percent) | Retentate after evaporation (weight percent) |
|---|---|---|
| pH | 6.82 | 5.20 |
| Buffer capacity | 19.5 meq HCl/100 g |  |
| Buffer capacity/lactose | 19.5 |  |

The final product was pressed into rectangular blocks and sealed in gas-proof wrappers until required for processing. It was found suitable for conversion to processed cheese by the techniques used for the processing of conventionally-made cheese, Example 2

100 kilograms of pasteurized whole milk was acidified with concentrated hydrochloric acid to a pH of 5.7. The acidified milk was then heated to 50° C. and ultrafiltered in the module and in the manner described in Example 1 until weight of permeate removed was equal to 60% of the weight of the original milk.

The retentate was then diafiltered at constant volume described above until 65 kg of diafiltration water was added. The water was then turned off and ultrafiltration was resumed and continued until the weight of the retentate was reduced to 20% of the weight of the original milk, The fermentation, evaporation, and packaging steps were then carried out as described in Example 1. The final product was suitable for conversion to processed cheese, The calcium and phosphate content of the final product made in this Example were different from those of the final product made in Example 1, The properties of the processed cheese made from the final product of this Example were not markedly changed from those of the processed cheese made from the final product of Example 1.

The composition of retentate after the second ultrafiltration step but before fermentation and that of the final product were as follows:

|  | Retentate before fermentation (weight perent) | Retentate after evaporation (weight percent) |
| --- | --- | --- |
| Total solids | 36.9 | 64.0 |
| Fat | 19.6 | 33.6 |
| Protein | 15.6 | 25.6 |
| Lactose | 0.6 |  |
| Calcium | 0.26 | 0.45 |
| Orthophosphate | 0.49 | 0.85 |
| Sodium chloride |  | 1.6 |
| Lactic acid |  | 1.04 |

The pH, buffer capacity, and buffer capacity/lactose ratio were as follows:

|  | Retentate before fermentation | Retentate after evaporation |
| --- | --- | --- |
| pH | 5.87 | 5.10 |
| Buffer capacity | 8.30 |  |
| Buffer capacity/lactose | 13.8 |  |

The yields of final products in Examples 1 and 2 were 17.8% and 16.4%, respectively, greater than the yields of cheese which could have been made from the same quantity of milk by conventional cheesemaking technology. The precise yield increase is dependent on the protein/fat ratio of milk. The yield increases result from the retention of whey proteins in the final product. Since whey proteins are not removed during the process and since the protein composition of the products must reflect that of the original milk, approximately one-fifth of the protein content of these products must be whey protein. The relative amounts of the various milk components vary (for example, with season, breed of cattle, etc.) and these variations will be reflected in the relative amounts of the components in concentrates prepared in other times and places and in the yields obtained by the process.

The general procedures utilized in Examples 1 and 2 may be modified. For example, using the same general procedures of Examples 1 and 2 rennet and/or any other safe and suitable proteolytic or lipolytic enzyme may be added to the retentate prior to evaporation or at the same time as the lactic acid producing bacteria, provided that the quantity is insufficient to produce a coagulum. The enzyme treatment may make the product more suitable for conversion to processed cheese in some applications.

Furthermore, using the general procedures utilized in Example 1 (with or without the rennet or enzyme) the appropriate ratio of buffer capacity to lactose concentration may be achieved by diafiltering until 48 kg of water have been added, then ultrafiltering until the retentate is 30% of the weight of the original milk. This achieves the same ratio of lactose to buffer capacity but permits optimization of the selected amount of moisture removed by ultrafiltration and evaporation.

In addition, using the general procedures utilized in Example 2 (with or without the rennet or enzyme) the appropriate ratio of buffer capacity to lactose concentration may be achieved by diafiltering until 91 kg of water have been added, then ultrafiltering until the weight of the retentate is 30% of the weight of the original milk. This procedure changes the water removal process by variation of the relative extents of ultrafiltration and diafiltration, while retaining the same lactose to buffer capacity ratio in the final product.

The following examples 3 and 4 are examples of the process of this invention in semi-continuous form particularly illustrating the step and effects of preheating the fermented retentate prior to evaporation.

Example 3

Whole milk, 2500 liters, was adjusted to a casein/fat ratio of 0.63 by the addition of 19.4 liters of cream containing 42% butterfat. The standardized milk was pasteurized at 72° C. for 15 seconds and was then ultrafiltered and diafiltered continuously through an Abcor model HFK130 membrane system containing 4 stages with 2 membranes per stage. The feed rate during ultrafiltration/diafiltration was 590 liters/hour. Diafiltration water was fed into stages 2, 3, and 4 at 40% of the initial milk volume. The operating temperature of the membrane system was maintained at 52° C. and the pressures maintained were 90 psi at the inlet and 30 psi at the outlet. Retentate was withdrawn from the continuous system at a rate of 126 liters/hour.

The 4.7 X retentate obtained, 530 liters, was pasteurized at 72° C. for 15 seconds and cooled to 25° C. Salt, in the form of dry powder, was added to the pasteurized retentate to a level of 1.6% water phase. The salted retentate was then innoculated with Streptococcus cremoris and Streptococcus lactis mixed starter culture in the form of a frozen concentrate at a level of 0.01% and incubated at 25° C., until a desired pH of 5.1 was obtained.

The fermented retentate at 25° C. was passed through an in-line Votator model ⅜ BW VOT scraped surface heat exchanger preheater. In the initial part of the run, the preheater was not turned on. Subsequently the preheater was turned on and the fermented retentate was preheated for approximately 22 seconds of flow through time duration to temperatures in the range of from 53° C. to 73° C. The fermented retentate was fed continuously to a Luwa model NL0050 swept surface vacuum evaporator at rates ranging from pounds per hour to 217.8 pounds per hour The rotor speed of the evaporator was maintained at 1200 rpm and the vacuum at 700 mm(Hg). During evaporation the jacket temperature of the evaporator was maintained at 127° C. at the inlet and 125° C. at the outlet by circulatory hot oil. The vapor temperature during evaporation was 34° C., and the product discharge temperature was 36° C. The feed rate to the evaporator was used to control the solids level of the final product in the range of from 58.51% to 65.95%. The final product was packaged in barrier bags and sealed for storage.

In this example, the following observations were made during the run relevant to the effects of preheating on phase separation:

| Time | Preheat Temp. | Feed Rate lbs./hr. | Approx. Preheat Time | % Total Solids in Final Product | Characteristics of Final Product |
|---|---|---|---|---|---|
| Startup 11:01 | | | | | |
| 11:20 | None | 217.8 | None | 58.51 | No phase separation |
| 11:30 | None | 207.9 | None | 59.24 | No phase separation |
| 11:37 | None | 198 | None | 60.85 | Phase separation |
| 11:55 | 53° C. | 207.9 | 72 sec. | 61.89 | Phase separation |
| 12:00 | 54° C. | 198 | 72 sec. | 62.35 | Phase separation |
| 12:15 | 65° C. | 207.9 | 72 sec. | 63.86 | No phase separation |
| 12:23 | 66° C. | 198 | 72 sec. | 64.24 | No phase separation |
| 12:32 | 66° C. | 193.1 | 72 sec. | 65.85 | No phase separation |
| 12:45 | 73° C. | 217.8 | 72 sec. | 62.13 | No phase separation |
| 1:00 | 73° C. | 207.9 | 72 sec. | 63.46 | No phase separation |
| 1:20 | 73° C. | 207.9 | 72 sec. | 64.18 | No phase separation |
| 1:40 | 73° C. | 207.9 | 72 sec. | 64.13 | No phase separation |
| 1:55 | 73° C. | 207.9 | 72 sec. | 65.95 | No phase separation |
| 2:15 | 73° C. | 207.9 | 72 sec. | 64.09 | No phase seperation |
| 2:30 | 73° C. | 207.9 | 72 sec. | 63.95 | No phase separation |
| 2:37 | Run ended. | | | | |

In this example 2500 liters of milk were processed into 520 liters of 4.7 X retentate which produced 663 lbs of final product. This represented a 12.05% recovery (yield) from milk. Composition of the retentate before fermentation and of the final product were as follows:

| | Retentate wt. % | Final Product wt. % |
|---|---|---|
| Total Solids | 36.1 | 64.2 |
| Fat | 19.2 | 33.2 |
| Protein | 14.4 | 25.2 |
| Lactose | 1.3 | 0.2 |
| Calcium | 0.40 | 0.70 |
| Orthophosphate | 0.72 | 1.36 |
| Sodium Chloride | — | 1.6 |
| Lactic Acid | — | 1.9 |
| pH | 6.85 | 5.05 |
| Buffer Capacity | 17.3 | — |
| | (meq HCL/100 g) | |
| Buffer Capacity/Lactose | 13.3 | — |

It was further observed from this example that preheating the fermented retentate sufficiently to prevent phase separation had a tendency to reduce the viscosity of the final product, and reduce burn-on on the interior wall surface of the evaporator.

Example 4

Whole milk, 5460 liters was adjusted to a casein/fat ratio of 0.63 by the addition of 45 liters of cream containing 40% butterfat. The standardized milk was pasteurized at 72° C. for 15 seconds and was then ultrafiltered and diafiltered continuously through an Abcor model HFK130 membrane system containing 4 stages with 2 membranes per stage. The feed rate during ultrafiltration/diafiltration was 570 liters/hour. Diafiltration water was fed into stages 2, 3, and 4 at 36% of the initial milk volume. The operating temperature of the membrane system was maintained at 52° C. and the pressures maintained were 90 psi at the inlet and 30 psi at the outlet. Retentate was withdrawn from the continuous system at a rate of 116 liters/hour.

The 4.9 X retentate obtained, 1114 liters, was pasteurized at 72° C. for 15 seconds and cooled to 25° C. Salt, in the form of dry powder, was added to the pasteurized retentate to a level of 1.6% water phase. The salted retentate was then innoculated with Streptococcus cremoris and Streptococcus lactis mixed starter culture in the form of a frozen concentrate at a level of 0.01% and incubated at 25° C., until a desired pH of 4.95 was obtained.

The fermented retentate at 25° C. was preheated in-line in a Votator model ¾ BW VOT swept surface preheater in a range from 68° to 75° C. for approximately 70 seconds and fed to the Luwa model NL0050 swept surface vacuum evaporator at rates ranging from 287 to 396 lbs/hour. The rotor speed of the evaporator maintained at 1200 rpm and the vacuum at 720 mm(Hg). During evaporation the jacket temperature of the evaporator was maintained at 110° C. at the inlet and 109° C. at the outlet by steam at a pressure of 50 KPA. The vapor temperature during evaporation was 34° C., and the product discharge temperature was 38.6° C. The feed rate to the evaporator was used to control the solids level of the final product in the range of from 58.3% to 66.4%. The final product was packaged in barrier bags and sealed for storage.

In this example 5460 liters of milk were processed into 1114 liters of 4.9 X retentate which produced 1,406 lbs of final product. This represented a 11.71% recovery (yield) from milk.

Composition of the retentate before fermentation and of the final product were as follows:

| | Retentate wt. % | Final Product wt. % |
|---|---|---|
| Total Solids | 37.3 | 66.1 |
| Fat | 19.4 | 33.5 |
| Protein | 14.9 | 25.7 |
| Lactose | 1.5 | 0.1 |
| Calcium | 0.44 | 0.77 |
| Orthophosphate | 0.79 | 1.36 |
| Sodium Chloride | — | 1.74 |
| Lactic Acid | — | 2.1 |
| pH | 6.8 | 4.9 |
| Buffer Capacity | 18.1 | — |
| | | (meq HCL/100 g) |
| Buffer Capacity/Lactose | 12.1 | — |

In this example, no phase separation occurred in the evaporator in a total running time of 7¼ hours with percent total solids in the final product as high as 66.4%. It was again observed that preheating the fermented retentate sufficiently to prevent phase separation had a tendency to reduce viscosity of the final product and to reduce burn-on on the interior wall surface of the evaporator.

It should be noted that a percent total solids in a final product sample as high as 71.5% has been achieved without phase separation with a preheat temperature of 72 C. at flow-through preheat time duration of 70 seconds.

Those skilled in the art will appreciate that the invention described herein is susceptible to variations and modifications other than those specifically described. It is to be understood that the invention includes all such variations and modifications which fall within its spirit and scope.

We claim:

1. A process for production of cheese from milk comprising:
   (a) ultrafiltering the milk;
   (b) diafiltering the milk, said ultrafiltering and diafiltering being carried out so as to produce a retentate having a solids composition desired in said cheese and having a concentration ratio of from about 3:1 to 6:1 compared to the milk treated in step (a);
   (c) adding to said retentate from about 0.5 to 1.5 percent sodium chloride, by weight of the retentate, before forming any coagulum to maintain said retentate in the liquid phase during fermenting;
   (d) fermenting said retentate with a lactic acid producing culture to produce a liquid fermented retentate, said fermenting being carried out with the pH of the retentate decreasing during fermentation from the pH of the retentate after diafiltration to a pH between about 4.9 and about 5.5, said fermented retentate containing no coagulum; and
   (e) preheating said fermented retentate prior to evaporation to a temperature in the range of about 60° C.–100° C. and sufficient to prevent phase separation in the form of the appearance of free fat during evaporation and then continuously evaporating water from said fermented retentate under a pressure below atmospheric pressure to produce said cheese comprising substantially all of the casein and whey proteins originally present in said milk.

2. The process of claim 1 wherein said milk is whole milk.

3. The process of claim 1 wherein said milk is selected from the group consisting of whole milk, skim milk, part-skim milk, reconstituted milk products and recombined milk products.

4. The process of claim 1 wherein said preheating temperature is within the range of about 60° C. to about 75° C. with a percent total solids composition in said cheese in the range of about 58 percent to about 71 percent.

5. The process of claim 1 wherein said preheating is effective to reduce burn-on of fermented retentate on the walls of the evaporator.

6. The process of claim 1 wherein said preheating is effective to reduce the viscosity of said cheese.

7. The process of claim 1 wherein said fermented milk is preheated to a temperature in the range of about 60°–75° C.

8. The process of claim 1 wherein the cheese produced is further converted to processed cheese.

9. The process of claim 1 wherein the fermenting is continuous.

10. The process of claim 1 wherein the pH of said retentate decreases during fermentation to between about 5.0 and about 5.3.

11. The process of claim 1 wherein the step of evaporating water reduces the moisture content of the fermented retentate to produce a solids content of about 65%.

12. The process of claim 1 wherein about one percent sodium chloride is used.

13. The process of claim 1 wherein the step of evaporating water reduces the moisture content of the fermented retentate to produce a cheese with a total solids composition in the range of about 58 percent to about 71 percent.

14. A process for production of cheese from milk which has been ultrafiltered and diafiltered to produce an adjusted milk having a constituent composition, excluding water, substantially the same as that of said cheese, said ultrafiltered and diafiltered milk having a concentration ratio of from about 3:1 to 6:1 compared to the milk prior to ultrafiltration and diafiltration, comprising:
   (a) increasing the ionic strength of said adjusted milk by adding from about 0.5 to 1.5 percent sodium chloride, by weight of the adjusted milk, before forming any coagulum so as to maintain said milk in the liquid state during fermenting;
   (b) fermenting said milk with a lactic acid producing culture to produce a liquid fermented adjusted milk, said fermenting being carried out with the pH decreasing during fermentation from the pH of the adjusted milk after diafiltration to a pH between about 4.9 and about 5.5, said fermented retentate containing no coagulum;
   (c) adding an enzyme selected from the group consisting of proteolytic enzymes and lipolytic enzymes to the milk, the quantity of enzyme added being insufficient to produce coagulation; and then
   (d) preheating said fermented milk to a temperature in the range of about 60° C.–100° C. and sufficient to prevent occurrence of phase separation in the form of the appearance of free fat during water removal and then continuously evaporating water from said fermented milk under a pressure below atmospheric pressure to produce said cheese comprising substantially all the casein and whey proteins originally present in said milk.

15. The process of claim 14 wherein said milk is selected from the group consisting of whole milk, skim milk, part-skim milk, reconstituted milk products and recombined milk products.

16. The process of claim 14 wherein said milk is whole milk.

17. The process of claim 14 wherein said fermented adjusted milk is preheated to a temperature in the range of about 60°–75° C.

18. The process of claim 14 wherein the cheese produced is further converted to processed cheese.

19. The process of claim 14 wherein the proteolytic enzyme comprises rennet.

20. The process of claim 14 wherein said preheating temperature is within the range of about 60° C. to about 75° C. with a percent total solids composition in said cheese in the range of about 58 percent to about 71 percent.

21. The process of claim 14 wherein said preheating is effective to reduce burn-on of fermented milk on the walls of the evaporator.

22. The process of claim 14 wherein said preheating is effective to reduce the viscosity of said cheese.

23. The process of claim 14 wherein the fermenting is continuous.

24. The process of claim 14 wherein the pH of said adjusted milk decreases during fermentation to between about 5.0 and about 5.3.

25. The process of claim 14 wherein the step of evaporating water reduces the moisture content of the fermented adjusted milk to produce a solids content of about 65%.

26. The process of claim 14 wherein about one percent sodium chloride is used.

27. The process of claim 14 wherein the step of evaporating water reduces the moisture content of the fermented adjusted milk to produce a cheese with a total solids composition in the range of about 58 percent to about 71 percent.

* * * * *